United States Patent [19]
Wolfgang

[11] Patent Number: 5,833,202
[45] Date of Patent: Nov. 10, 1998

[54] MECHANICAL FASTENING SYSTEM FOR MODULAR MICRO-OPTICAL ELEMENTS

[75] Inventor: Andreasch Wolfgang, St-Sulpice, Switzerland

[73] Assignee: Leica AG, Heerbrugg, Switzerland

[21] Appl. No.: 669,336

[22] PCT Filed: Nov. 10, 1995

[86] PCT No.: PCT/EP95/04423

§ 371 Date: Sep. 20, 1996

§ 102(e) Date: Sep. 20, 1996

[87] PCT Pub. No.: WO96/15467

PCT Pub. Date: May 23, 1996

[30] Foreign Application Priority Data

Nov. 15, 1994 [DE] Germany ............... 44 40 772.6
Sep. 11, 1995 [DE] Germany ............... 195 33 426.4

[51] Int. Cl.[6] .................... A47B 91/00; G02B 7/02
[52] U.S. Cl. ............... 248/466; 248/174; 248/188.7; 248/188.9; 359/817; 108/165
[58] Field of Search ................... 248/466, 603, 248/618, 300, 174, 469, 188.1, 188.7, 188.9, 463, 464; 359/871, 817; 29/557; 72/379.2; 108/165

[56] References Cited

U.S. PATENT DOCUMENTS

| | | | |
|---|---|---|---|
| D. 25,316 | 3/1896 | Dobson | 248/174 X |
| 1,555,554 | 9/1925 | Cohn | 248/174 |
| 1,688,111 | 10/1928 | Bohle | 72/379.2 X |
| 1,852,751 | 4/1932 | Johnson | 248/188.9 |
| 2,653,000 | 9/1953 | Cadwell et al. | 248/188.7 |
| 2,753,586 | 7/1956 | Metz | 248/188.9 |
| 3,020,617 | 2/1962 | Dopera | 248/174 |
| 3,208,707 | 9/1965 | Blumrich | 248/188.9 |
| 3,418,035 | 12/1968 | Rau | 359/817 X |
| 4,566,661 | 1/1986 | Mestler | 248/188.7 X |
| 4,569,496 | 2/1986 | Fleishman | 248/174 X |
| 5,131,611 | 7/1992 | Vollaro | 244/158 |

FOREIGN PATENT DOCUMENTS

| | | | |
|---|---|---|---|
| 883 589 | 9/1980 | Belgium . | |
| 0 051 574 | 5/1982 | European Pat. Off. | G12B 5/00 |

*Primary Examiner*—Robert W. Gibson, Jr.
*Assistant Examiner*—Stephen S. Wentsler
*Attorney, Agent, or Firm*—Bean, Kauffman & Snyder

[57] ABSTRACT

A mechanical fastening system is disclosed in which standard micro-optical elements are initially mounted on respective one-piece frames which in turn may be secured in position on a mounting plate. Each frame has a platform to which at least three legs are flexurally joined along respective hinge axes. In one embodiment, the legs include corresponding spherical segments for point-contact with the mounting plate. In another embodiment, the legs include corresponding foot portions connected by a ball-joint for three-degrees of rotational freedom. The one-piece frames may be efficiently manufactured by laser beam cutting or punching a steel sheet. The proposed fastening system enables uni- or multi-dimensional layouts to be created using automatic placing and fastening technologies.

27 Claims, 5 Drawing Sheets

MECHANICAL FASTENING SYSTEM FOR MODULAR MICRO-OPTICAL ELEMENTS

BACKGROUND OF THE INVENTION

The application relates to a mechanical fastening system for individual optical modules on a mounting plate for manufacturing optical or opto-electronic systems. This can involve arranging different optical components to make up complete uni- or multi-dimensional complete systems.

A great variety of framing and mounting technologies have become established for optical components such as lenses, prisms, and mirrors. They extend from sticking small prisms on supports, whereby the prism has to be held in the correctly aligned position until the adhesive has hardened, through to various prism "stools" with or without grips or spring-mounted clips, cf. H. Naumann and G. Schröder, "Optical components", 4th edition, Karl Hanser Verlag Munich and Vienna, 1983, page 272. This prior art reveals for example that the mounting of optical components has to be specially adapted to the individual component because of the many different forms and functions.

SUMMARY OF THE INVENTION

The present invention is based on the assumption that a modern automatic optical system manufacturing process needs to use mechanically standardized components in which an individual optical component is mounted, especially an individual micro-optical component (light beam diameter 5 mm). Micro-optical elements can for example be laser diodes, micro-lenses, integrated optical modules, glass-fibre bundles, fibre-optic rods, diffractive elements, detectors, sensors, filters, mirrors, screens, etc.

The availability of standard components, which can for example be mounted within a rectangular parallelepiped shaped housing, is an initial fundamental simplification for handling and for the crucial positioning and orientation of this rectangular parallelepiped relative to a mounting plate.

The function of the present invention is to propose a mechanical fixing system for optical elements which are mounted in an individual housing. Further subfunctions are to propose processes for manufacturing such fastening elements and applications for them. Before finally fastening the micro-optical element mounted in a module, it (together with its housing) has all translational and rotational degrees of freedom, whilst after fastening on the mounting plate the position and orientation of the micro-optical element are permanently fixed (number of degrees of freedom: 0).

This technical function is performed in the device disclosed by the characteristic features of the main claim. Further beneficial provisions are disclosed in the sub-claims.

With the aid of the fastening system which is the object of the invention it is now possible to attach standardized components on a mounting plate with precision, for example using manipulation and robot systems. This makes it possible to produce 1- to 3-dimensional layouts. Standard elements of modular design can easily be aligned and attached in one assembly step, enabling flexible automated assembly of various micro-optic devices. With the fastening system based on the object of the invention it is possible to manufacture a permanent mechanical bond between the micro-optical element and the mounting plate, ensuring the position and orientation of each micro-optical element relative to the mounting plate.

BRIEF DESCRIPTION OF THE DRAWINGS

The invention is described in greater detail below with reference to the figures.

There is a diagrammatic view of.

DETAILED DESCRIPTION OF THE PREFERRED EMBODIMENTS

Figure 1:
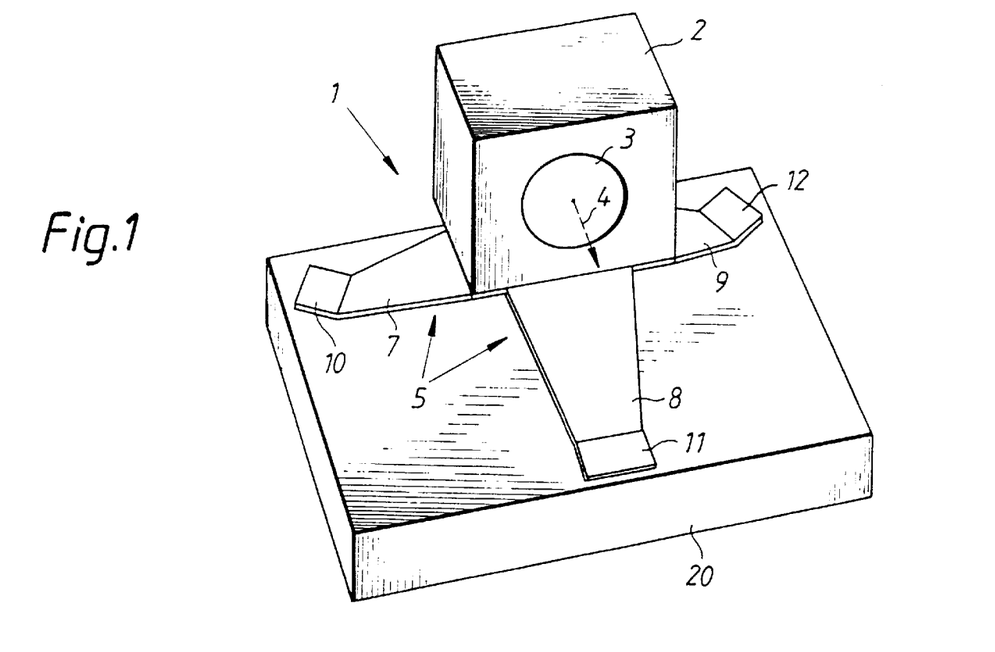
FIG. 1: the assignment of a standard component to a mounting plate using a "tripod" frame based on the object of the invention.

In FIG. 1 a standard component 1 is shown drawn as a rectangular parallelepiped containing a micro-optical element 3 (in this drawing a micro lens with an optical axis 4). The underside of the rectangular parallelepiped 2 is fixed on a frame based on the object of the invention, which in this drawing is in the form of a "tripod" mounting 5. Three limbs 7–9 are offset in the direction of the mounting plate 20 from a platform which is not shown in FIG. 1, to which feet 10–12 for their part are linked. The feet are in contact with the mounting plate 20. As long as these feet are not firmly linked to the mounting plate 20, the standard component 1 can be positioned or orientated in relation to all six degrees of freedom.

Figure 2:
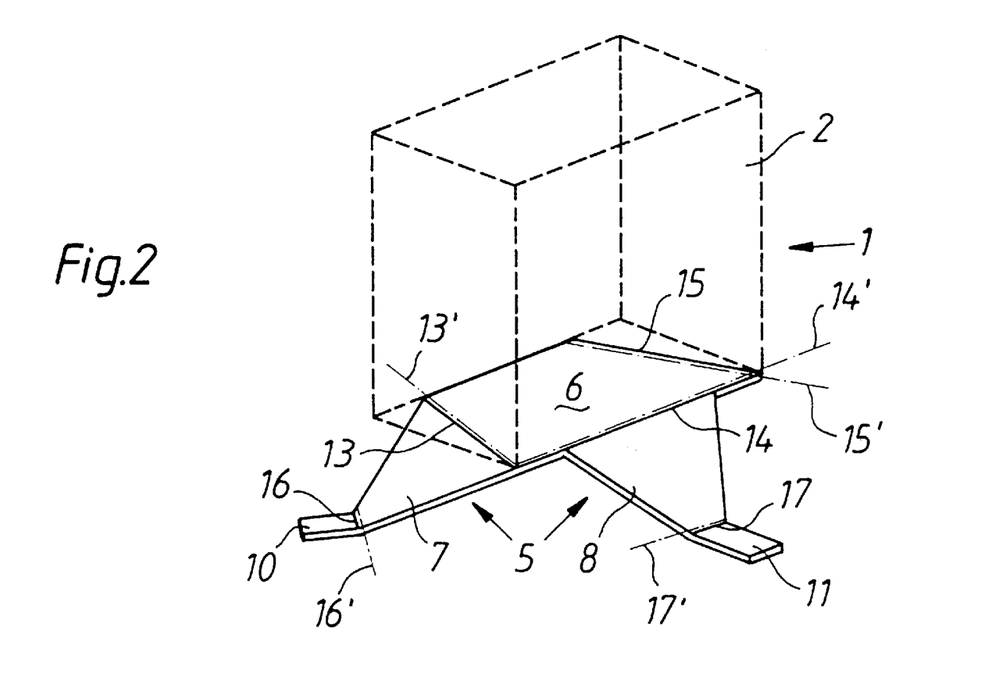
FIG. 2: geometrical details of the "tripod" frame based on the subject of the invention with an indication of the standard rectangular parallelepiped shaped tripod component.

The geometry of the frame 5 based on the object of the invention is explained in greater detail in FIG. 2. The platform 6 is shown, on which there is a graphic indication of the rectangular parallelepiped 2. The underside of the rectangular parallelepiped 2 does not correspond with the tapering surface of platform 6; this is the case only in the front area—as shown. 13'–15' show "hinge axes". They represent to a certain degree the bending lines of the legs 7–9 to be bent. In FIG. 2 hinge axes 16' and 17' are correspondingly, around which the feet 10 or 11 are turned up or offset.

Figure 3:
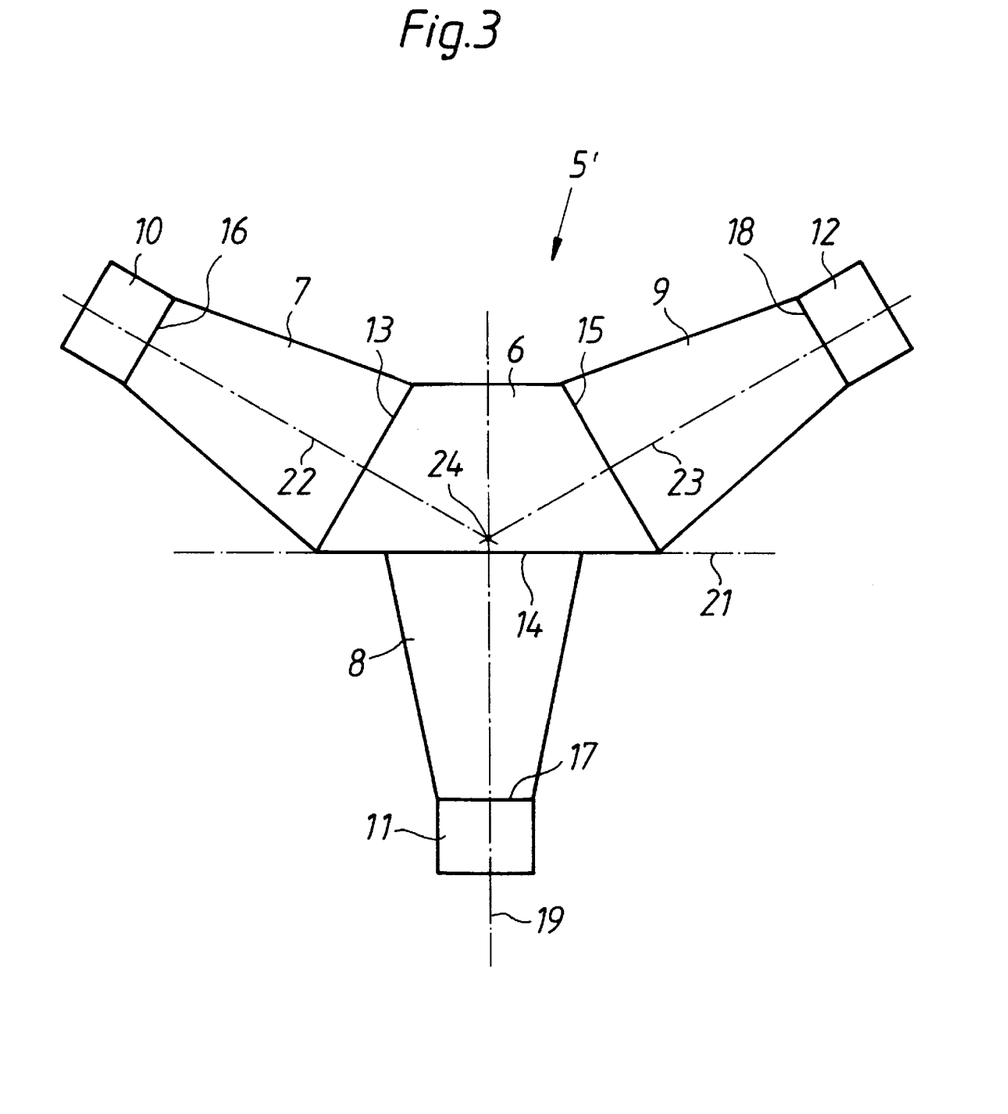
FIG. 3: the geometry of a 2-dimensional basic structure of a "tripod" based on the object of the invention.

FIG. 3 shows the geometrical relations of a "tripod" frame system based on the object of the invention. It shows the 2-dimensional basic structure 5'. This basic structure represents virtually a "cut-out" model for a basic sheet. Platform 6 is a halved regular hexagon, with the bisection running along the connecting line 21 which joins two diametrically opposed corners of a hexagon. Three areas arranged in a star shape ("3 legs") go out from the platform 6. Each consists of a limb 7, 8, 9 and associated foot 10, 11, 12. The hinges belonging to each leg are seen to run parallel to each other. The center uprights 22 and 23 of the legs 7, 10 and 9, 12 intersect at track 19 of the plane of symmetry of the "tripod" frame 5 or its 2-dimensional basic structure 5' at a point 24. If the platform 6 was half of a regular hexagon in the mathematical sense, point 24 would lie precisely on the connecting line 21. The fundamental symmetrical relations of the fastening system are shown clearly in FIG. 3. Of particular significance is the presence in every case of a plane of symmetry, cf its track 19. In the spatial representation of FIG. 1 the plane of symmetry which is not shown would run so that it stands perpendicular on mounting plate 20 containing the optical axis 4. These considerations naturally involve approximations, since the fastening system based on the object of the invention is deliberately deformed in the fixed state, can be deliberately deformed—as provided for in the adjustment corrections made. This however does not in any way change the fundamental considerations on the symmetry relations.

FIG. 1 in combination with FIG. 3 also clearly shows that the total system (standard component 1 and frame 5) is "stackable" in direction of the optical axis 4. This is intended to illustrate that several total systems can be fixed one behind the other in a close sequence in the manner of an optical bank one behind the other on the mounting plate, at a close linear distance from each other. The geometrical arrangement of the legs of the fastening system means the legs of two mountings positioned one behind the other along the optical axis 4 do not obstruct each other. It is naturally also possible to have a 2-dimensional layout configuration instead of a 1-dimensional arrangement along the optical axis 4, in the manner of an optical bank. This only requires the use of light deflecting components (prisms, mirrors, fibre-optic rods, fibre bundles, integrated optics, etc.) as micro-optic elements with modular mounting.

Of course it is also possible to provide mountings with (3+x) legs instead of a "tripod" frame, where x=1,2, . . . n. For example if the leg 8, 11 in FIG. 3 is for example omitted, and the remaining system is reflected at line 21, this creates a basic structure with a hexagonal platform and four legs. If for example you distort the resultant structure along the axis 19 so that the platform is to some extent deformed in a diamond shape, this gives yet another fourfold configuration. It is also possible to form the platform for example as a triangle, rectangle, square or pentagon, and fitted with a corresponding number of legs. It is at all events of significance that the fastening system has at least one plane of symmetry standing perpendicular on the mounting plate 20. This ensures uniform relations in terms of mechanical stability and thermal effects. In order to increase the "stackability" of such fastening systems based on the subject of the invention, as shown for example by a pentagonal or hexagonal platform, it is also possible to omit at least one leg.

Further versions of the 2-dimensional basic structure are shown in FIGS. 4 to 7. In comparison to the basic structure presented in FIGS. 1 to 3, they all share the feature that when the platform 6 or the rectangular parallelepiped 2 are tipped, they ensure better fitting of the feet 10 to 12 on the mounting plate. This is naturally an advantage with automatic assembly technology. In general terms, additional degrees of freedom are introduced into the geometry of the legs by the examples shown in FIGS. 4 to 7.

Figures 4, 4A:
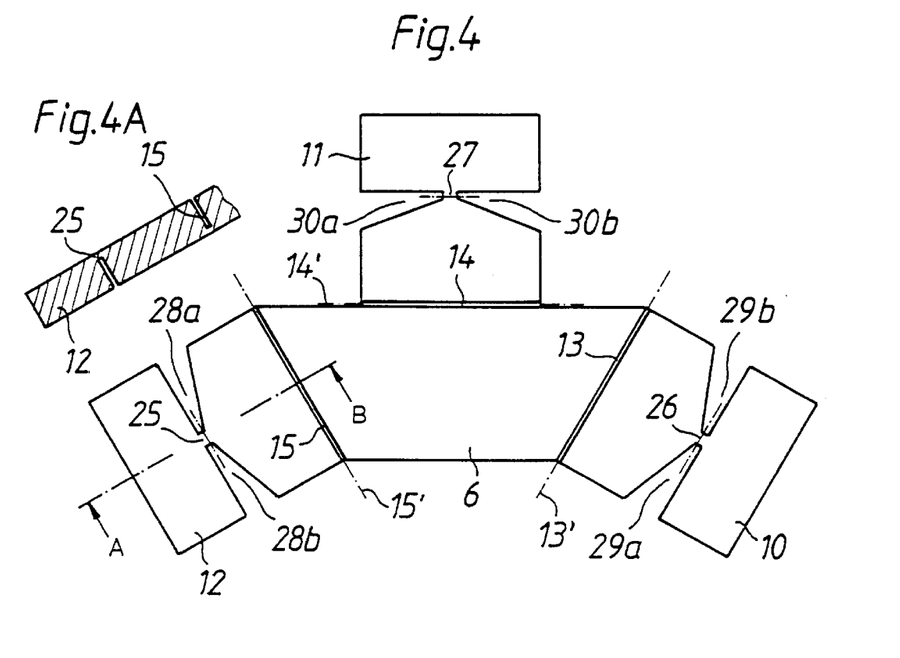
FIG. 4: A second version of a basic structure for a fastening system based on the object of the invention with "ball-joints"
Fig. 4A: a cross-sectional view taken generally along the line A-B in FIG. 4.

In FIG. 4 there is just one narrow material bridge between the limb part and the foot 12, which can be described as a "ball-joint" 25 with three rotational degrees of freedom. Similar considerations naturally also apply to the two other legs. The shape shown is naturally not a ball-joint in the proper sense, since there is no two-piece ball/socket combination. This version providing three degrees of freedom can thus be described as a "solid state joint", which is intended to convey that it is made out of one-piece material. In the version shown in FIG. 4 this is achieved by having two wedge-shaped sections 28a/28b-30a/30b in pairs symmetrically in each leg.

The example of the detail drawing belonging to FIG. 4, showing a section along the line A-B, can be used to show the design of the ball-joint 25 or of the hinge 15. Narrow gaps are introduced into the 2-dimensional basic structure consisting of one-piece material (for example made of 1 mm sheet steel) along the points provided for the hinges or ball-joints. This can for example be carried out by means of wire electrical erosion, precision cutting, stamping, etc. The detail sketch shows that a narrow gap from the top downwards is created for forming the hinge 15, leaving only a small material bridge—as a sort of 1-dimensional longitudinal strip. This creates a hinged joint with a degree of freedom. The "ball-joint" 25 is created by introducing a gap as it were from the underside of the basic structure into the narrow connecting strip already created between foot 12 and limb. This creates a solid state joint with three degrees of freedom. Foot 12 can be adapted to the spacial relations as required, especially the topographical structure of the mounting plate 20. The characteristic of a hinged joint 15 or of a "ball-joint" 25 is finally created by means of elastic deformation in the areas locally limited by the gap applied. The same applies for all other hinges 13,14 and "ball-joints" 26,27 shown.

Figure 5:
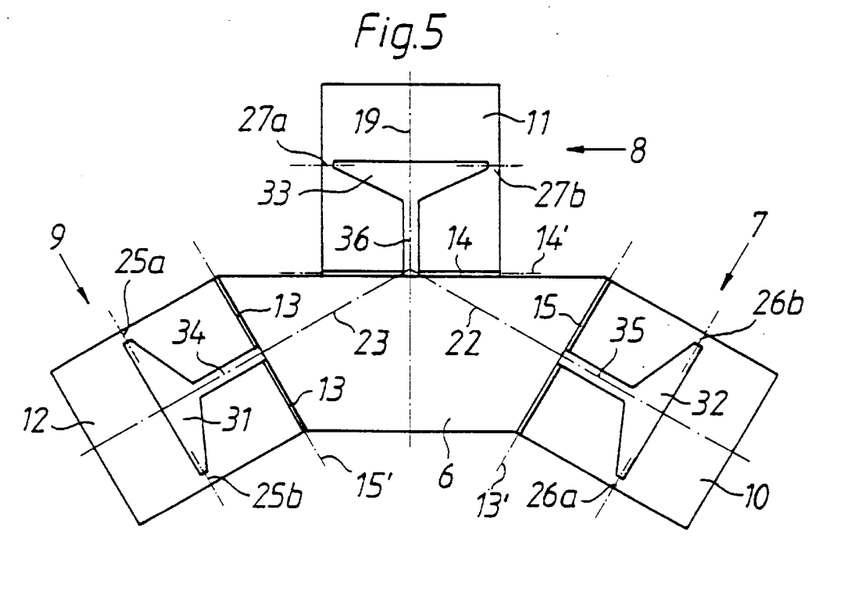
FIG. 5: a third version of a 2-dimensional basic structure of the fastening system based on the object of the invention with "ball-joints" arranged in pairs at maximum distance.
Figure 6:
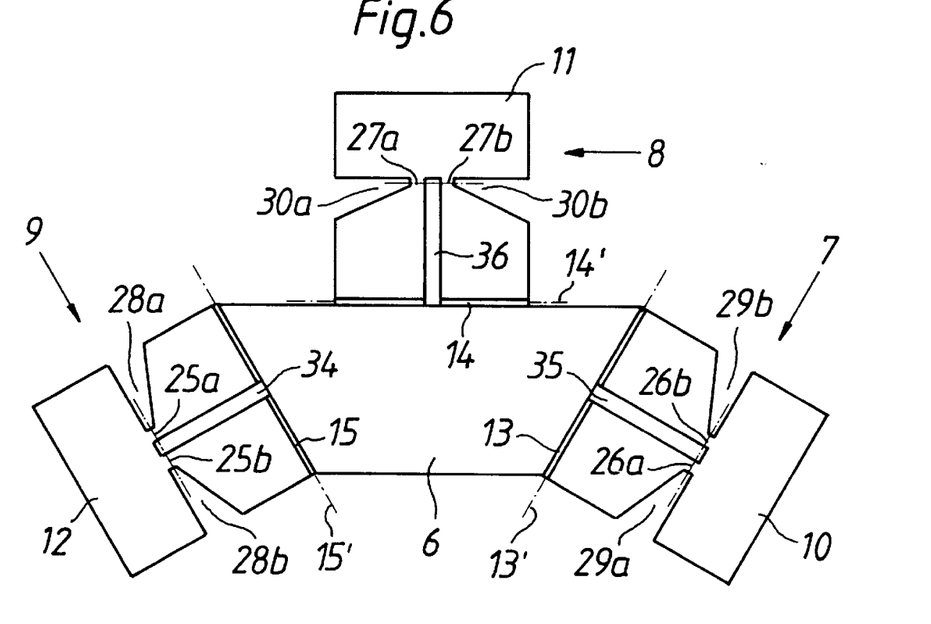
FIG. 6: a fourth version of a 2-dimensional basic structure of the fastening system based on the object of the invention with "ball-joints" arranged in pairs at minimum distance.

In FIG. 5 one "ball-joint/hinge combination" is shown per leg. Instead of just one "ball-joint" per leg, there are now two "ball-joints" 25a/25b and 26a/26b and 27a/27b per leg. Compared to the example described in FIG. 4, the variant shown in FIG. 5 has the advantage that the smallest material diameter is double for each leg in the solid state "ball-joints". This configuration is created by triangular recesses 31–33 inside the leg regions, and by the additional application of a parallel gap 34-36 along the central uprights 22, 23 and 19 in the direction of platform 6. These "ball-joint/hinge combinations" contribute to increasing mechanical stability. If the distance between the "ball-joints" for each leg is reduced, this results in the version shown in FIG. 6.

Figure 7:
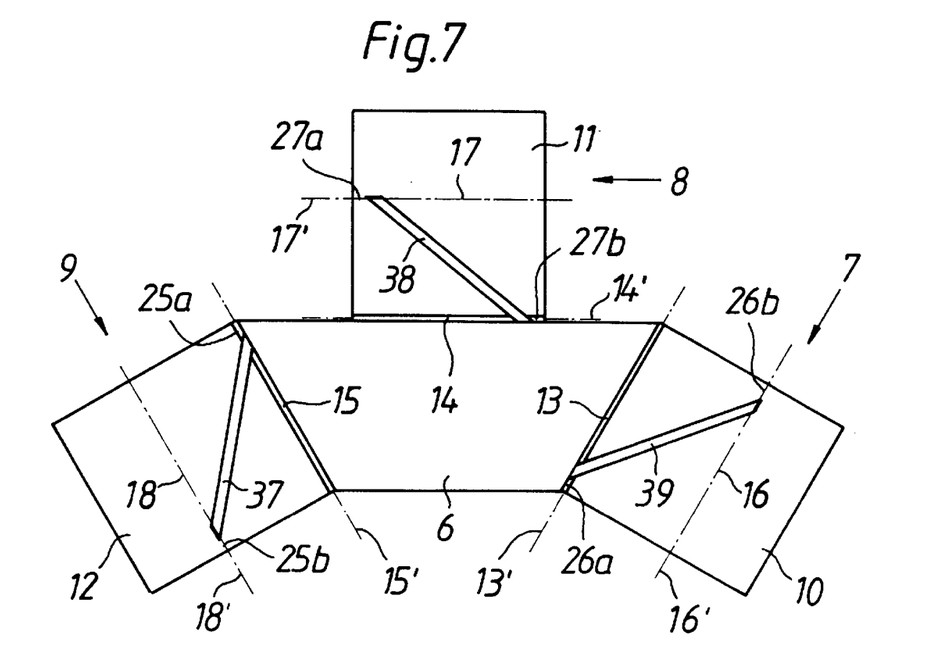
FIG. 7: a fifth version of a 2-dimensional basic structure of the fastening system based on the object of the invention with a special combination of "ball-joints" and hinges.

In the fifth version based on the object of the invention, shown in FIG. 7, a hinge and "ball-joint" are interchanged for each leg, and arranged so as to save space.

This is to be explained in greater detail by means of the example of the leg with limb 7 and foot 10. In the area of the limb 7 a gap 39 (preferably parallel) runs in a diagonal direction. On the one hand this meets the hinge axis 13' in such a way that it divides up the whole hinge into a hinge area 13 with a degree of freedom and a "ball-joint" 26a with three degrees of freedom, and on the other hand it encounters the hinge axis 16' in such a way that it conversely divides the hinge into a "ball-joint" 26b (three degrees of freedom) and a hinge area 16 (one degree of freedom). The same applies to the other two legs shown as including respective hinge areas 17 and 18 similar to hinge area 16; respective hinge axes 17' and 18' similar to hinge axis 16'; and respective diagonal gaps 38 and 37 similar to gap 39. This version based on the subject of the invention retains a space-saving variant guaranteeing a high degree of flexibility in use.

Figure 8:
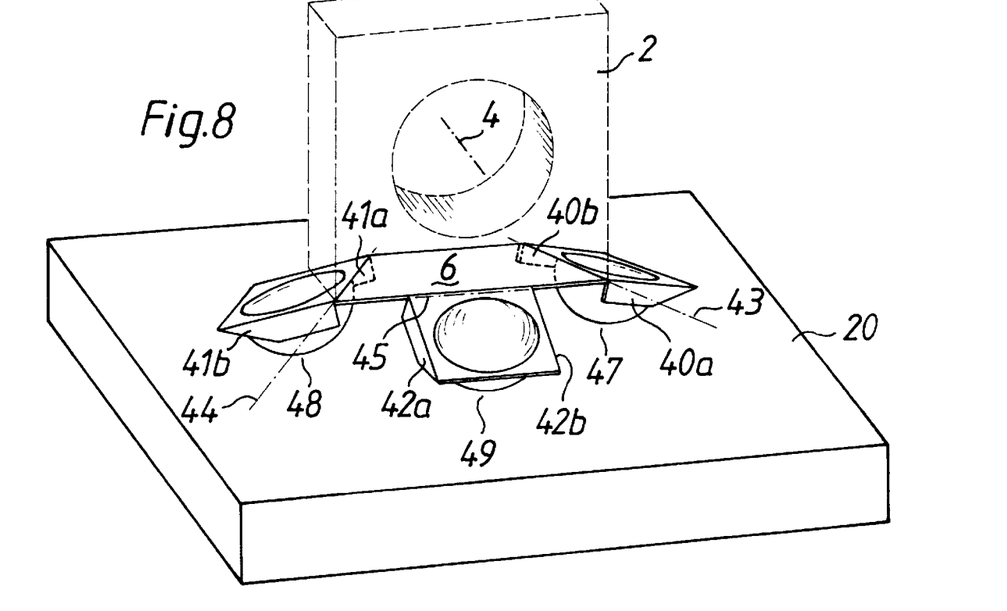
FIG. 8: another version with hollow hemispherical "ball legs" with hinge axes marked.
Figure 9:
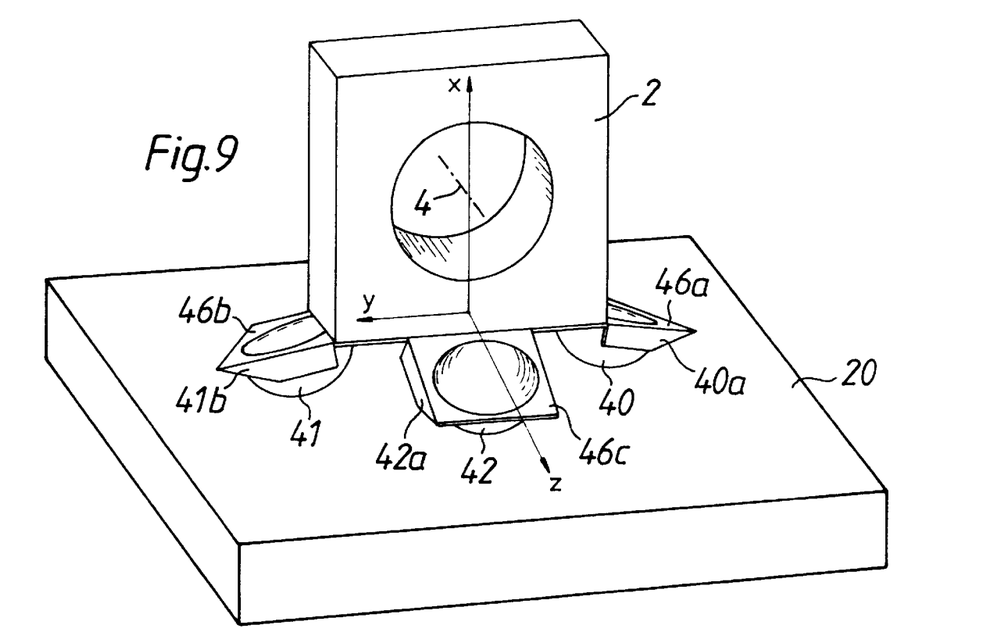
FIG. 9: the version shown in FIG. 8 with marked coordinate system and improved representation of the spherical segment geometries.

A further version of the object of the invention is shown in FIGS. 8 and 9. Here again a platform 6 (FIG. 8) is shown, as already presented in FIGS. 2 to 7. In contrast to the versions mentioned hitherto, the fastening system shown in FIG. 8 or 9 does not have legs consisting of limbs and feet; they are rather "ball legs" 47–49. They consist of hollow, hemispherical bulges in the manner of a pith helmet, the "spherical segments" 40–42, and also a flat peripheral area 46a–46c each, in the manner of an equatorial plane, and finally bracing profile pairs 40a, 40b; 41a, 41b; 42a, 42b in the style of a turned-up hat rim. These "ball legs" 47–49 are angled in directly in one piece at platform 6.

The positions of the flexural hinges 43–45 (cf FIG. 8) in each case or their axes are determined by the joints of the various folded bracing profile pairs 40a, 40b; 41a, 41b; 42a, 42b to platform 6. Each of the hinges 43–45 can be returned to a flexural area approximately limited locally to one straight line. A further factor contributing to rigidity is that each hinge axis 43–45 and each of the side bracing profile pairs 40a, 40b; 41a, 41b; 42a, 42b lies tangential to the upper edge of the hollow hemisphere (spherical segments 40–42). It is of course also possible to have other curved spatial shapes instead a geometrically precise spherical shape (this always refers to a hollow hemisphere shape), achieving a point application on a mounting plate 20. Such spatial shapes can be "deformed" spheres, "geoids", single- or multi-axis rotational ellipsoids or "barrel-" or "lens-shaped" halves of hollow bodies. Production engineering considerations make the hemispherical hollow shape or a ball socket hollow shape preferable.

In accordance with the coordinates system marked in FIG. 9, the rectangular parallelepiped 2 can be moved vertically along the x axis and/or the two horizontally oriented y axes (perpendicular to the optical axis) and z (along the optical axis), without the position of the contact points on the mounting plate 20 changing.

The proposed spherical geometry is initially suitable for all spot joining techniques (e.g. spot welding, especially laser spot welding), but surface joining techniques such as gluing, soldering, etc can also be used. When gluing, the contact point acts as a mechanical reference ensuring higher positional stability as the adhesive dries.

To increase leg stability, a further angled bracing profile can be provided in the front area of the spherical segments 40–42, running parallel to the particular hinge axis 43–45.

An alternative is the crown-shaped continuation of the side bracing profile pairs 40a, 40b; 41a, 41b; 42a, 42b, around the upper edge of the particular spherical-segment 40–42.

The "ball tripod" can be produced for example in a follow-on composite tool in large quantities made of thin sheet steel can be produced in a cost-effective manner by crimping and punching.

Surprisingly it was found that the shape of the legs 47–49 shown and described in FIG. 8 or 9 is the best solution for achieving a high level of rigidity. But without limiting function, further variants for forming the area between the spherical contact surface and the hinge 43–45 concerned are possible.

The spherical shape proposed represents an approximation to the geometrically ideal surface shape involving no variation of the contact point. The typical deviation with suitably selected hemisphere radii is thus 10 $\mu$m.

All materials that can be shaped or formed (especially metals) can be used for production, with some production processes (e.g. sintering ceramics) requiring design adaptations.

It can be proven mathematically that n legs (where n=3, 4, . . . ) do not lead to excess statical rigidity in the unsecured state. Therefore a "ball 4 leg" is also suitable in particular where the requirement of good "stackability" is retained.

The geometrical dimensions of the "ball tripod" shown are as follows:
Trapezoidal angle of platform (6) 60°
Rectangular parallelepiped (2) 10×10×4 mm$^3$
Length of hinges between (6) 4.6 mm and (7–9) or 43–45)
Height of platform (6) in angled-in state 2.12 mm
Angle between the platform (6) and the 20° limbs (7–9) or the flat peripheral areas (46a–46c) "Spherical" diameter of the segments (40–42) 1.8–2.2 mm All designs share the desirable feature of opening up possibilities of movement without play, of making cost-effective industrial production feasible, and assembly using robot techniques possible. Basic structures can for example be produced by laser cutting or punching. If thin sheet metal parts are used, e.g. 0.05 mm stainless steel sheet, it is suggested in respect of the object of the invention that the limbs 7–9 be subsequently reinforced or braced. This can for example be achieved by fastening thicker sheet steel parts suitably cut to shape, for example with a thickness of 0.5 mm, using suitable fastening methods (laser spot welding, gluing, snap fitting) over the whole surface of the limbs. Alternatively it is also possible to brace the legs just by shaping them suitably, e.g. by producing sheet bracing profile geometries. As already mentioned, the hinges or the "ball-joints" can be produced by using a material-removing subtractive process, (spark erosion, precision cutting, chemical etching, ion etching, etc). It is naturally also possible to produce corresponding linear "bend" areas using forming processes (pressing, punching), which can function as places of elastic ductility.

The present invention is not limited to the versions described and presented in the drawings. On the contrary it is also possible to provide further geometrical form variants. The use of the proposed fastening systems is finally not limited to modules containing a micro-optical element 3; it is rather merely a dimensioning question, so that "macro"-optical elements mounted as an individual module can be aligned in the proposed technology.

With the fastening systems based on the object of the invention it is possible to permanently mount optical components so they are resistant to shock and vibration over wide temperature ranges. The main materials that can be used for producing the basic structure 5', apart from special steel, are all other materials which can be appropriately machined and also have durable flexural characteristics in the hinge and joint areas. For example laser spot welding or gluing are methods known in the art as fastening techniques for the rectangular parallelepiped on platform 6 or the feet 10–12 on the mounting plate 20. The advantages of the fastening system based on the object of the invention can be summarized as follows:

a) The mounted micro-optical element 3 can be micro-manipulated using 6 degrees of freedom to precisely position or orient it;

b) Only three fastening points are necessary in the minimum case for permanent fixing, (reducing the number of degrees of freedom to zero);

c) Fastening can be by means of laser spot welding or gluing;

d) Modest requirements are made of laser beam positioning;

e) The contact points are nearly constant with adjustment movements along the axes (x, y, z);

f) There is good accessibility for the fastening system because of the design features;

g) The optical axis 4 can extend without restriction within an individual module 2;

h) Assembly handling which lends itself to automation can be achieved;

i) Its modest space requirements enable a high "packing density"; the systems are stackable in the direction of the optical axis 4.

What is claimed is:

1. A mechanical fastening system for mounting a modular component containing a micro-optical element on a mounting plate, said micro-optical element defining an optical axis, said fastening system comprising:

a one-piece frame having a central platform adapted to be fixed to a surface of said component, and at least three legs flexurally joining with said platform along respective first hinge axes, and wherein the shape of said platform is half of a substantially regular hexagon, wherein said half is formed by a straight cut along a connecting line between two diametrically opposed corners of said hexagon; and each of said at least three legs terminating in a foot portion for contacting said mounting plate, said foot portion flexurally joining with said leg along a second hinge axis parallel to said first hinge axis of said leg.

2. The fastening system according to claim 1, wherein said frame is created from a generally star-shaped sheet, said sheet having a first one of said legs extending from a first edge of said platform corresponding to said connecting line, a second one of said legs extending from a second edge of said platform adjacent to said first edge, and a third one of said legs extending from a third edge of said platform adjacent to said first edge and opposite said second edge; and said frame has an imaginary plane of symmetry which bisects said platform and said first leg into two trapezoidal portions.

3. The fastening system according to claim 2, wherein a pair of imaginary planes bisecting said second and third legs, respectively, intersect to define a line in said plane of symmetry intersecting with said platform.

4. The fastening system according to claim 3, wherein said first edge is between 7–12 mm in length, said first hinge axes are between 4–7 mm in length, said second hinge axes are between 2–3.5 mm in length, said foot portions are between 1.5–2.5 mm in length, and the angle between said pair of imaginary planes bisecting said second and third legs is between 118°–122°.

5. The fastening system according to claim 2, wherein said optical axis is in said plane of symmetry.

6. The fastening system according to claim 1, wherein all of said legs are geometrically identical and all of said foot portions are geometrically identical.

7. The fastening system according to claim 6, wherein each of said legs is defined by opposite side edges converging symmetrically from said first hinge axis of said leg to said second hinge axis of said leg, and each of said foot portions is rectangular in shape.

8. A mechanical fastening system for mounting a modular component containing a micro-optical element on a mounting plate, said micro-optical element defining an optical axis, said fastening system comprising:

a one-piece frame comprising a single sheet of material having a central platform adapted to be fixed to a surface of said component, and at least three legs flexurally joining with said platform along respective hinge axes; and each of said at least three legs having a spherical segment arranged for contacting said mounting plate at a single contact point.

9. The fastening system according to claim 8, wherein each said spherical segment is a hollow hemisphere.

10. The fastening system according to claim 8, wherein each said spherical segment is a spheroid.

11. The fastening system according to claim 8, wherein each said spherical segment is surrounded by a corresponding flat peripheral area of said leg having said spherical segment.

12. The fastening system according to claim 11, wherein each of said legs includes a pair of profile braces extending along opposite side edges of said corresponding flat peripheral area generally normal to said flat peripheral area.

13. The fastening system according to claim 12, wherein each of said pairs of profile braces extends to meet said platform to form a flexural hinge therewith.

14. A mechanical fastening system for mounting a modular component containing a micro-optical element on a mounting plate, said micro-optical element defining an optical axis, said fastening system comprising:

a one-piece frame having a central platform adapted to be fixed to a surface of said component, and at least three legs flexurally joining with said platform along respective hinge axes: and each of said at least three legs terminating in a foot portion for contacting said mounting plate, said foot portion flexurally joining with said leg at a pair of ball-joints, each of said ball-joints providing three rotational degrees of freedom.

15. The fastening system according to claim 14, wherein said pair of ball-joints are solid state joints.

16. The fastening system according to claim 14, wherein said pair of ball-joints are arranged at a maximum distance from each other to define a triangular cut-out section in said leg, and a narrow cut-out section is provided to extend along a centerline of said leg from said triangular cut-out section to said hinge axis.

17. The fastening system according to claim 14, wherein said pair of ball-joints are arranged closely adjacent each other to define a pair of symmetrically opposing wedge-shaped cut-out sections in said leg, and a narrow cut-out section is provided to extend along a centerline of said leg from said foot portion to said hinge axis.

18. A mechanical fastening system for mounting a modular component containing a micro-optical element on a mounting plate, said micro-optical element defining an optical axis, said fastening system comprising:

a one-piece frame having a central platform adapted to be fixed to a surface of said component, and at least three legs flexurally joining with said platform along respective first hinge axes; and each of said at least three legs terminating in a foot portion for contacting said mounting plate, said foot portion flexurally joining with said leg along a second hinge axis parallel to said first hinge axis of said leg, wherein each said leg includes a diagonally oriented narrow cut-out section extending from said first hinge axis to said second hinge axis to define a hinge joint providing one rotational degree of freedom and a ball-joint providing three rotational degrees of freedom on each of said first and second hinge axes.

19. The fastening system according to claim 18, wherein said hinge joints and said ball-joints are solid state joints.

20. A process for manufacturing a fastening system for mounting a modular component containing a micro-optical element on a mounting plate, said micro-optical element defining an optical axis, said process comprising the steps of:

a) producing a one-piece, star-shaped basic structure from sheet material, said structure including a central platform and at least three legs extending outward from said central platform, said basic structure having an axis of symmetry;

b) press-forming a hollow hemispherical segment in each of said at least three legs;

c) bending each of said at least three legs on opposite sides of said hemispherical segment to provide a pair of profile braces on said leg; and d) angling said at least three legs relative to said platform in the direction of said mounting plate.

21. The process according to claim 20, wherein said basic structure is produced by punching said sheet material.

22. The process according to claim 20, wherein said basic structure is produced by laser beam cutting said sheet material.

23. The process according to claim 20, wherein hinge axes are provided for angling said legs relative to said platform, and said hinge axes are formed by a subtractive material-removing procedure.

24. The process according to claim 20, further comprising the step of fastening said hemispherical segments to said mounting plate by laser beam spot welding.

25. The process according to claim 24, wherein said laser beam spot welding is carried out by an automatically controlled manipulator.

26. The process according to claim 20, further comprising the step of fastening said hemispherical segments to said mounting plate by soldering.

27. The process according to claim 26, wherein said soldering is carried out by an automatically controlled manipulator.

* * * * *

UNITED STATES PATENT AND TRADEMARK OFFICE
CERTIFICATE OF CORRECTION

PATENT NO. : 5,833,202
DATED : November 10, 1998
INVENTOR(S) : Mr. Wolfgang Andreasch It is certified that error appears in the above-identified patent and that said Letters Patent is hereby corrected as shown below:

On the title page, item [75] Inventor: should read --Wolfgang Andreasch--.

On the title page, item [19] should read --Andreasch--.

Signed and Sealed this

Sixteenth Day of March, 1999

Attest:

Q. TODD DICKINSON

*Attesting Officer*  *Acting Commissioner of Patents and Trademarks*